US012675538B2

(12) United States Patent
Mukherjee et al.

(10) Patent No.: US 12,675,538 B2
(45) **Date of Patent: \*Jul. 7, 2026**

(54) GUIDED WEB CRAWLER FOR AUTOMATED IDENTIFICATION AND VERIFICATION OF WEBPAGE RESOURCES

(71) Applicant: PayPal, Inc., San Jose, CA (US)

(72) Inventors: Sourish Mukherjee, Bengaluru (IN); Dalvinder Singh, Fremont, CA (US); Elanselvan Ganesan, Tirunelveli (IN); Subhadip Panja, Bangalore Urban (IN); Subramania Jeeva Kandasamy, Chennai (IN); Vikram Ramakrishnan, Chennai (IN); Vishak S. Bharadwaj, Bangalore Urban (IN)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/984,605

(22) Filed: Dec. 17, 2024

(65) Prior Publication Data

US 2025/0225189 A1 Jul. 10, 2025

Related U.S. Application Data

(63) Continuation of application No. 18/296,536, filed on Apr. 6, 2023, now Pat. No. 12,197,516.

(51) Int. Cl.
G06F 16/951 (2019.01)
G06F 16/954 (2019.01)

(52) U.S. Cl.
CPC .......... *G06F 16/951* (2019.01); *G06F 16/954* (2019.01)

(58) Field of Classification Search
None
See application file for complete search history.

(56) References Cited

U.S. PATENT DOCUMENTS

| | | | |
|---|---|---|---|
| 7,707,152 B1 | 4/2010 | Greenfield et al. | |
| 8,595,370 B2 | 11/2013 | Kumar et al. | |
| 8,612,420 B2 | 12/2013 | Sun et al. | |
| 8,954,416 B2 | 2/2015 | Tuttle et al. | |
| 10,261,679 B2 * | 4/2019 | Boodhoo | G06F 40/183 |
| 10,509,843 B2 * | 12/2019 | Bare | G06F 16/9566 |
| 10,915,523 B1 | 2/2021 | Paiz | |
| 11,210,464 B2 | 12/2021 | Sharshevsky et al. | |
| 11,366,862 B2 | 6/2022 | Gabdrakipov | |

(Continued)

*Primary Examiner* — Debbie M Le
(74) *Attorney, Agent, or Firm* — Haynes and Boone, LLP

(57) ABSTRACT

There are provided systems and methods for a guided web crawler for automated identification and verification of webpage resources. A service provider, such as an online transaction processor, may provide a guided web crawler and/or resources for such crawler for execution by computing devices of users. Users may load different pluggable modules to the guided web crawler, which are associated with specific web crawling tasks. Web crawling tasks may correspond to identification and verification of webpage resources on a webpage, such as a location, placement, use of, and/or number of appearances of the resource. The web crawler may use code from the pluggable module being executed to parse and/or crawl webpage data for a webpage and identify requested resources. Thereafter, the guided web crawler may automate resources to use, display, and/or interact with the identified and verified resource.

20 Claims, 7 Drawing Sheets

(56)　　　　　　　References Cited

U.S. PATENT DOCUMENTS

| 11,423,097 | B2 | 8/2022 | Cohen et al. |
| 11,444,977 | B2 | 9/2022 | Starov et al. |
| 11,588,919 | B2 | 2/2023 | Ando |
| 11,741,171 | B2 | 8/2023 | Kravitz et al. |
| 11,971,932 | B2 | 4/2024 | Sharshevsky et al. |
| 2014/0331119 | A1 | 11/2014 | Dixon et al. |
| 2023/0033078 | A1 | 2/2023 | Tang et al. |
| 2023/0132457 | A1 | 5/2023 | Ghamsari et al. |

* cited by examiner

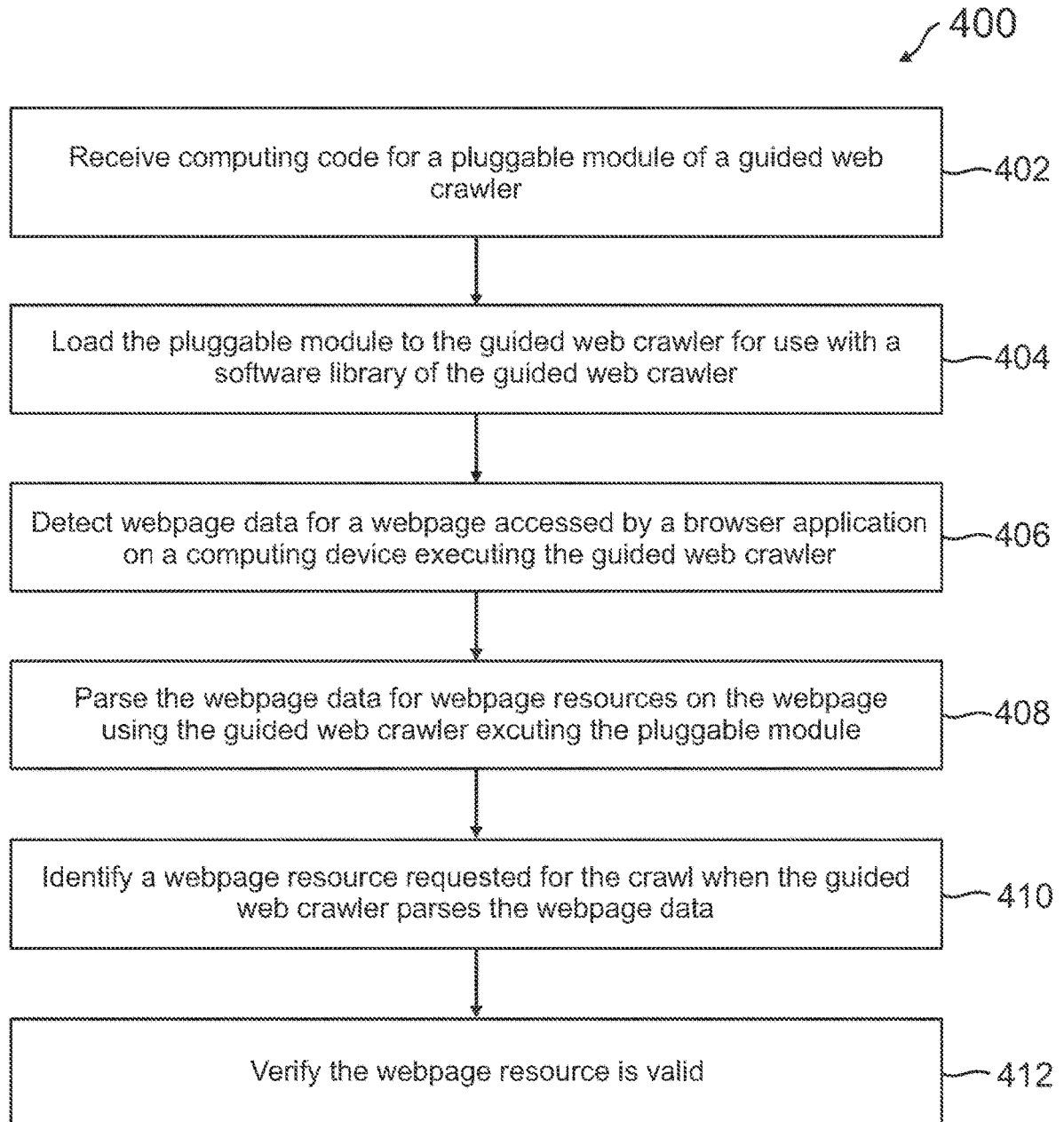

400

Receive computing code for a pluggable module of a guided web crawler ~402

Load the pluggable module to the guided web crawler for use with a software library of the guided web crawler ~404

Detect webpage data for a webpage accessed by a browser application on a computing device executing the guided web crawler ~406

Parse the webpage data for webpage resources on the webpage using the guided web crawler excuting the pluggable module ~408

Identify a webpage resource requested for the crawl when the guided web crawler parses the webpage data ~410

Verify the webpage resource is valid ~412

FIG. 4

GUIDED WEB CRAWLER FOR AUTOMATED IDENTIFICATION AND VERIFICATION OF WEBPAGE RESOURCES

CROSS REFERENCE TO RELATED APPLICATION

The present application is a continuation of and claims priority to U.S. patent application Ser. No. 18/296,536, filed Apr. 6, 2023, the disclosure of which is hereby incorporated in its entirety.

TECHNICAL FIELD

The present application generally relates to identifying webpage resources and assets, and more particularly to utilizing pluggable coded modules with a guided crawler to automate identification and verification of webpage resources.

BACKGROUND

An online service provider may provide services to users that may be utilized with websites and corresponding webpages. An online transaction processor may provide computing services associated with online shopping and transaction processing. These services may include those associated with processing transactions electronically when generated on merchant websites, as well as locating items, informing users of discounts and/or applying discounts, and engaging in comparison shopping. Other service providers may provide similar or additional services that interact with and/or utilize webpage resources and assets. However, conventionally users are required to locate and interact with such resources and assets. More recently, web crawlers provide functionality to consume webpage resources and provide information on such resources and other assets located on webpages.

These operations may be performed through a software application, web browser and/or web browser extension, or the like that may provide webpage crawling processes to crawl or systematically browse designated webpages and/or webpages of a selected website for certain information, options, navigations, executable tasks or operations, and the like. For example, an application may monitor websites and/or their corresponding webpages for data using an automated crawler that generally performs scheduled or requested crawling to browse and locate visits of each link or until a maximum number of links are identified. However, after crawling, determining webpage elements, features, and data utilizes manual efforts, which is prohibitive due to the time and resources. Further, conventional automated computing tools for browsing generally crawl a website for resources and do not have or require specific knowledge of the webpage(s) and layouts of the webpage(s) in order to properly identify and verify resources of interest to a user. Thus, it is desirable for online service providers to utilize guided or specific web crawling to identify and verify specific and/or user-designated webpage resources.

BRIEF DESCRIPTION OF THE DRAWINGS

FIG. 4 is a flowchart for automated identification and verification of webpage resources, according to an embodiment.

Figure 1:
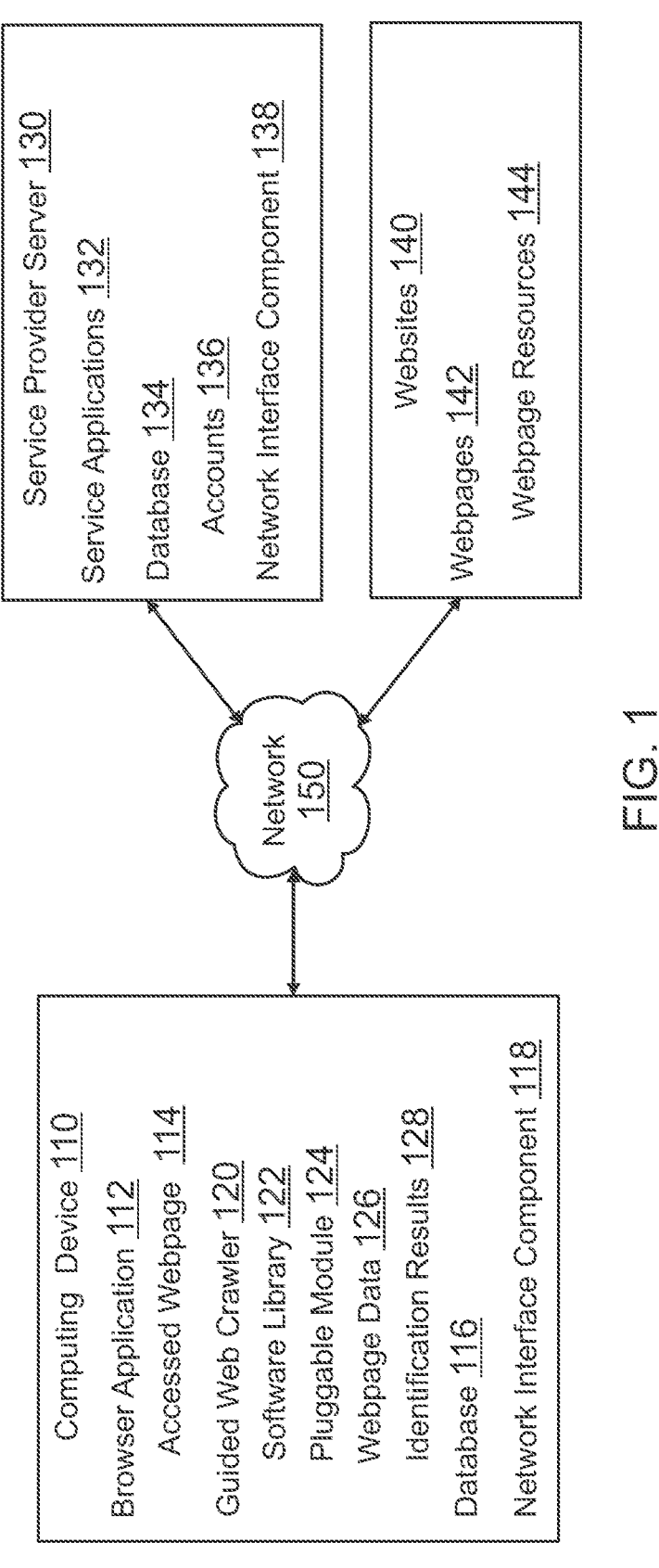
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a guided web crawler for automated identification and verification of webpage resources. Systems suitable for practicing methods of the present disclosure are also provided.

A service provider, such as PAYPAL® or HONEY®, may provide services associated with electronic transaction processing and incentives, such as discounts, when checking out and paying for transactions electronically on merchant websites. To provide these services, the service provider may provide a browser tool, add-on, extension, or the like, as well as a resident dedicated application (e.g., mobile application), that may parse, scrape, and/or crawl webpages of a website for an entity, such as a merchant. This may allow the service provider to identify items, webpage executable elements and/or fields for electronic transaction processing and/or discount identification and entry, and other service provider operations. Other service providers may also provide different computing services through crawling and identifying data on websites visited by users and/or designated webpages selected by a user, which may provide different benefits and utilities to users. However, with the vast array of different website constructions and webpage layouts, data presentations, and the like, service providers may encounter difficulties in identifying and verifying resources and data available when users visit different webpages.

In this regard, the operations of the browser, dedicated service provider or merchant application, and/or application extension may be utilized with a guided web browser executing individual pluggable application modules in coded data packages that are configured, written, and/or generated by different end users including customers, developers, administrators, and the like that may be performing and/or assisting in guided web crawling. These pluggable modules may be used for monitoring, identifying, verifying, and/or extracting data for different features, assets, and/or resources on multiple webpages of different websites of merchants or other entities. A guided crawler may allow users to simulate a browsing session and selectively crawl parts of the website and its corresponding webpages. The guided crawler may operate by performing actions based on certain user input including clicking a link, scrolling a page, searching for keywords/terms in a page, filling a webpage form and/or webpage fields, and the like, which may be used to carry out a browsing flow. The browsing flow (executed by the guided crawler) may be a set of inputs, navigations, instructions, and the like that obtain the information that the user is looking for in the most efficient manner or a manner that is more efficient than manual browsing and inputs.

All these inputs are provided using the guided crawler with a pluggable module. Users may provide specific crawling logic and/or commands in the form of a script or coded modules that may guide the crawling session in a manner conducive to the users use case (e.g., to perform the web browsing activities and/or interactions with a website and/or webpages that the user has requested). In addition to scripts and coded modules, user input and/or past user behaviors or data may be used to guide a crawling session, which may be used in tandem with machine learning (ML) models and operations to predict desired user crawling goals and/or use cases. This may allow users to eliminate unnecessary nuances of a website and/or webpage browsing on a website, thereby reducing the volume of unrequired data to be loaded, downloaded, and/or reviewed by a user and/or automated executable component (e.g., web crawler or bot) to a large extent. This may therefore provide a technical solution that identifies and verifies resources and sub-resources of a webpage during a web crawl thus providing an advancement over existing procedures and web crawler technology that mandates manual navigation and relies on capabilities of developer tools of browsers to verify the resources of a webpage. Thus, the guided crawler with user configurable pluggable modules may provide a platform for users to supply those pluggable modules while using an enriched library of the guided crawler, which users may invoke from their module. The library may include helper functions, such as finding text in a page, performing a login, selecting an element, entering data to a field, performing a navigation, and the like. This allows the guided crawler to perform automated functions that assist users in focusing on and inspecting websites for specific behaviors, including those associated with fraud and risk by performing user-flow based navigation, scrutinizing resources on a webpage, and analyzing webpage contents at scale.

In this regard, the guided crawler may be operated by initially supplying, loading, identifying and/or otherwise providing a pluggable module for execution by the guided crawler during a crawl of one or more webpages, such as a crawling session. The module has capabilities to identify resources through their text or position in a webpage, as well as other identifying webpage characteristics and/or code including identifiers, tags, hypertext markup language (HTML) snippets or code, and the like. The module may further have capabilities to perform actions including filling out a form, clicking on an element, hovering over an element, scrolling up/down, etc. The module may identify resources and take appropriate action to proceed with the crawl in an intentional but automated manner without manual efforts by the user. The module with the guided crawler on a webpage may request the platform to save the complete HTML webpage or a specific sub-resource of the webpage. The sub-resource of the webpage could be images, scripts, stylesheets, videos, etc. When any webpage's content is pulled, the returned response may contain all assets and resources required for the browser to assemble, display, and/or otherwise generate, render, and/or output the webpage. These assets and resources may then be sent as HTTP responses for processing by the web browser, and further the guided crawler executing the pluggable module. For example, each response may then be intercepted to using a response event listener and responses of "interesting" or relevant (to the parameters, code, and/or other data from the pluggable module and/or crawler library) sub-resources may be intercepted and filtered out. The response may be validated with various checks to ensure it is a valid sub-resource, and then the sub-resource may further be processed and stored in distributed data storage. The sub-resource can be matched against a sub-resource repository for verification in some embodiments.

These coded data packages correspond to code, identifiers, and other data for asset and resource identification and verification on webpages, where each asset or resource identifies a webpage element, data, or other feature on the webpages. In some embodiments, pluggable modules may be designed and coded to be webpage agnostic, and therefore may be usable across multiple different websites and their corresponding webpages. However, other pluggable modules may be website-specific and/or specific to selected webpage(s). The browser extension and/or application may execute the data packages to process scraped and/or extracted webpage code and elements. The data packages may be used to determine whether the webpage includes the corresponding webpage feature for the resource of interest. If so, corresponding data may be extracted and/or processed to provide a service of the website, service provider, browser extension, and/or application to the user via the computing device.

For example, initially, a code developer, data coder, data scientist, administrator, or other user of the service provider may establish the coded data packages for the pluggable modules, and users in an ecosystem or crowd-sourced environment may further generate and/or tailor pluggable modules. Such pluggable modules may identify webpage resources by terms, code, identifiers, and/or other data. The term may correspond to a term to identify on the different webpages, such as "product", "total", "price", "description", as well as combinations of terms and/or sequences, such as "add-to-cart" and the like. Other terms may also be used for websites different than merchant websites. An HTML attribute that is used for searching of the resource in HTML code for the webpages may also be used. For example, with HTML elements, the elements may have an attribute, type, or tag including "id" (e.g., a unique identifier), "class" (e.g., for classifying elements), "style", "title", and the like. The data packages may also search using webpage style information, HTML tags, and/or regular expression (regex) for the webpage, which may apply a further filter on top of the term. The user may also generate or specify an intent or an action, executable process, provided information, or the like for a resource in a coded data package that represent a path to finding a resulting asset or resource. An intent may correspond to the goal of the resource, such as, on merchant websites, a final price, a question for "Is the product sold out?", add an item to digital shopping cart, navigate to a cart page, and the like. Intent data packages may further include an identifier or other title that allows for coding of the intent with other intents when generating one or more final data packages for the pluggable modules.

Resources for or included in the webpage elements may be determined from the webpage's document code and/or data. The extension or application may determine whether specific webpage features, data, elements, or the like for resources are present using the coded data packages, and therefore navigate to and/or identify such resources requested by the user. For example, the webpage may include fields, data, and the like for item or product information and images, item identifiers, digital shopping cart information and/or access, shipping information, billing information, a total, a coupon field, available coupons and coupon information, and the like. The webpage may be parsed and/or processed for the corresponding resources. Once the proper webpage feature, data, or element is identified, data for that feature or other webpage property may be determined and/or extracted. For example, for a feature corresponding to an item advertisement or available item for purchase, item information may be extracted, such as a description, a price, an image, a name or identifier, and/or other data. Where data other than text is parsed and/or crawled, additional data processing (e.g., image processing, audio or speech processing, etc.) may be used by the guided crawler to identify and/or determine features of that data and whether a desired resource for the crawling session is present in the data. Thus, image, video, audio, interactive games or web applications, and the like may also be crawled for resource identification and verification over textual data alone. Where the intent may correspond to whether the webpage feature is a calculated final total, data for that total, placement or identification of field for the total, or the like may be extracted. This may allow for users to perform electronic transaction processing and other operations on webpages that are crawled using a guided crawler and pluggable module(s).

For example, a user may wish to process a purchase of one or more items or services in a transaction. Selection of one or more items during an online transaction with a merchant website may require a payment instrument from the user for electronic transaction processing. A user may pay for one or more transactions using a digital wallet or other account with an online service provider or transaction processor (e.g., PAYPAL®), as well as the payment card (e.g., through proffering the physical card and reading card data or by entering card details and/or account numbers). An account and/or corresponding payment card with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions for items and digital gift cards (e.g., exact amount digital gift cards for detected transaction totals). The account creation may also be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and the other transaction processing services.

Once the account of the user is established with the service provider, the user may utilize the account via one or more computing devices, such as a personal computer, tablet computer, mobile smart phone, or the like. The user may engage in one or more online or virtual interactions, such as browsing websites and data available with websites of merchants. The transaction processor may determine and/or track the data over a plurality of visited websites, online resources, and/or applications, for example, using an application plugin, an application extension, or an application add-on using the coded data packages discussed herein. Such extensions and/or applications may be provided by a digital platform associated with the service provider and/or transaction processor (e.g., PAYPAL®, HONEY®, or another browser add-on).

In the manner, the service provider may provide browser or other application extensions and/or dedicated software applications that may be capable of identifying, verifying, and extracting data across websites and other online platforms for merchants and other entities. This allows for automated identification of assets and other resources through web crawling in a guided and automated manner without requiring manual efforts and/or unnecessary data processing through conventional web crawling technology. Further, the guided web crawler and pluggable modules allow for user configuration to automate user input operations and navigations in precise and task-specific manners. Thus, performance of web crawlers and resource identification/verification may be improved, and less computing resources may be required and consumed. Thus, the browser extensions and/or applications utilizing the guided crawler may more quickly execute the website data packages described herein to identify corresponding resources in an efficient and coordinated manner.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a computing device 110, a service provider server 130, and websites 140 in communication over a network 150. Computing device 110 may be used to process payments and/or engage in other computing services, such as through a payment or other computing service platform, application, and/or application extension, which may be facilitated through digital accounts and processing operations of service provider server 130. Computing device 110 may be utilized to provide a guided crawler application, application plug-in or extension, application operation and/or routines/subroutines, and the like. Computing device 110 may therefore crawl webpages of websites 140 for identification and verification of webpage assets, features, and/or other resources.

Computing device 110, service provider server 130, and/or websites 140 may each include or be associated with one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Computing device 110 may be implemented using any appropriate hardware and software configured for wired and/or wireless communication with service provider server 130 and/or websites 140. Computing device 110 may correspond to an individual user, consumer, or merchant that utilizes network 150 and platform provided by service provider server 130 for computing services, and may crawl or otherwise browse websites 140. In various embodiments, computing device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Computing device 110 of FIG. 1 contains a browser application 112, a guided web crawler 120, a database 116, and a network interface component 118. Browser application 112 and guided web crawler 120 may correspond to executable processes, procedures, and/or applications with associated hardware. In other embodiments, computing device 110 may include additional or different software as required.

Browser application 112 may correspond to one or more processes to execute modules and associated devices of computing device 110 to provide a convenient interface to permit a user for computing device 110 to browse webpages of websites including using a web crawler application, bot, operation, or the like to crawl webpages for assets, features, resources, and/or other data. In this regard, browser application 112 may correspond to specialized hardware and/or software utilized by computing device 110 that may access websites 140, retrieve website and/or individual webpage data, display such data, allow interaction with and/or navigation between webpages and/or webpage data, and the like. In some embodiments, browser application 112 may be used to provide transaction processing for the items, such as through a user interface enabling the user to enter and/or view the items that the user associated with computing device 110 wishes to purchase. This may be based on a transaction generated by browser application 112 using one or more merchant websites provided by one or more of websites 140. Browser application 112 may utilize user financial information, such as credit card data, bank account data, or other funding source data, as a payment instrument when providing payment information. Additionally, browser application 112 may utilize a digital wallet associated with an account with service provider server 130 as the payment instrument, for example, through accessing a digital wallet or account of a user through entry of authentication credentials and/or by providing a data token that allows for processing using the account. Browser application 112 may also be used to receive a receipt or other information based on transaction processing.

In various embodiments, browser application 112 may correspond to a general browser application configured to retrieve, present, and communicate information over the Internet (e.g., utilize resources on the World Wide Web) or a private network. For example, browser application 112 may provide a web browser, which may send and receive information over network 150, including retrieving website information, presenting the website information to the user, and/or communicating information to the website, including payment information for the transaction. However, in other embodiments, browser application 112 may include a dedicated application of service provider server 130 or other entity (e.g., a merchant), which may be configured to assist in browsing websites and/or processing transactions electronically, such as a mobile application on a mobile device. Browser application 112 may include, utilize, and/or integrate with guided web crawler 120 to provide guided web crawling sessions of webpages for websites, which may be used to identify and verify/validate resources on webpages. This may include performing other web crawling activities, including data entry, form filling, scrolling, navigation between fields, elements, and/or webpages, and other online network and/or website activity. Thus, when computing device 110 interacts with different online platforms and entities, including merchants and marketplaces, guided web crawler 120 may be executed to perform a guided crawl of one or more webpages including those of a designated website from websites 140.

Guided web crawler 120 may correspond to an operation of browser application 112, a standalone or separate software application, and/or browser extension, add-on, or plug-in. This extension may include operations to parse, monitor, and crawl webpage data in order to perform guided web crawls to locate, identify, validate and/or verifying an authenticity, navigate to, and/or interact with webpage resources, such as webpage data, interactable and/or selectable elements or buttons, fields and/or forms, media content (e.g., images, audio, video, animations, interactable media including games, etc.). In some embodiments, such resources may correspond to and/or include authentication fields and resources, such as a login to an account with service provider server 130, checkout and/or payment flows and fields for checkout data on a merchant website, payment processing requests, items and/or services for transaction processing, and the like. A JavaScript set or other code package may be passed by service provider server 130 to browser application 112 and/or guided web crawler 120, such as over network 150, that includes an enriched and/or pre-coded software library 122 having webpage and/or resource identifications, labels, tags, or the like.

For example, software library 122 may correspond to code packages, scripts, identifiers, tables, and/or the like that may be used when crawling and/or parsing webpage data, such as HTML and/or cascading style sheets (CSS) documents, to identify webpage resources, verify such resources are valid and what they purport to be, and/or interact with or navigate to such resources. In some embodiments, this may include crawling webpage data and/or a domain object model (DOM) tree for the webpage for resource identifiers, tags, or the like, as well as fields and/or data presented in webpages. Thus, guided web crawler 120 may utilize software library 122 to identify webpage elements and/or resources through HTML or extensible markup language (XML) tags, identifiers, code snippets or the like, as well as other data from HTML, CSS, or other webpage documents and data. In some embodiments, this may include analyzing a merchant website for a checkout process and processing flow (e.g., flow of computing operations to perform a checkout).

In order to provide a guided web crawl that identifies user selected and requested assets, features, and/or resources on a webpage, guided web crawler 120 may further use a pluggable module 124, where guided web crawler 120 may execute different pluggable modules available, loaded, installed, and/or provided during crawling sessions. Pluggable module 124 and other modules that may be loaded, executed, and/or exchanged/swapped during use and/or execution of guided web crawler 120 may be designated for a specific crawling task and may be configurable and/or coded, updated, and maintained by different users and/or systems for those crawling tasks. Pluggable module 124 and other pluggable modules may correspond to a coded data package or other modular computing code (e.g., data file) that may be loaded and executed by guided web crawler 120 in order to specifically identify and/or verify selected and/or requested webpage resources on one or more webpages accessed and/or identified for crawling through browser application 112.

For example, pluggable module 124 may be coded to imitate and/or mimic the actions and inputs of a user when browsing a webpage during crawling, such as by providing user inputs, selections, navigations, scrolling, mouse clicks, keyboard inputs, touch inputs, and the like. This may be performed to reduce unrequired data from loading, downloading, and/or rendering, where actions may be automated including inputs, authentications, form fillings, scrolling, navigations, clicks, and the like. Pluggable module 124 may have one or more specific webpage resources for webpage resource locating, identifying, outputting, navigating, and/or verifying (e.g., using a repository of valid resources and/or sub-resources for websites 140). Such operations may be performed to locate and verify data, as well as identify non-compliant merchants or other websites not having particular resources, scam websites, a prominence or placement of resources, and the like more easily. Such identifications may be based on webpage text, resource placements, code, and/or the like, and the identifications and other data may be extracted and/or utilized for outputs for the guided web crawl.

Browser application 112 may provide a window, interface, or other application field/element that allows for viewing webpages for websites 140 and guided crawling results or outputs from guided web crawler 120 after execution of pluggable module 124 with software library 122. For example, accessed webpage 114 may correspond to a webpage from one of websites 140, where a crawling operation is requested to identify one or more webpage resources selected for pluggable module 124. Webpage data 126 may be accessed, parsed, crawled, and/or otherwise processed by guided web crawler 120. Webpage data 126 may include HTML/XML/CSS documents and/or other data that may be used to identify and verify the selected webpage resources. Based on analyzing webpage data 126, identification results 128 may be determined and obtained by guided web crawler 120. Guided web crawler 120 may provide a separate or integrated window or interface to display identification results 128, or may utilize browser application 112 to display identification results 128 within a window, browsing session, interface, or the like, such as with accessed webpage 114. For example, identification results 128 may be used to locate, navigate to, highlight, and/or interact with one or more webpage resources (e.g., for authentication, form filling, login, selection or identification of webpage elements or data including items or services for purchase, and the like), which may be performed on, in, or with the browsing session and display of accessed webpage 114.

Computing device 110 may further include database 116 which may include, for example, identifiers such as operating system registry entries, cookies associated with browser application 112 and/or other applications, identifiers associated with hardware of computing device 110, or other appropriate identifiers. Identifiers in database 116 may be used by a payment/service provider to associate computing device 110 with a particular account maintained by the payment/service provider. Database 116 may also further store received webpage data, as well as processed data for guided web crawler 120 including pluggable module 124 and/or other modules. Thus, in various embodiments, scripts, code packages, files, and the like for execution by guided web crawler 120 may be stored by and loaded to/from database 116.

Computing device 110 includes at least one network interface component 118 adapted to communicate with service provider server 130, websites 140, and/or other servers, devices, and/or endpoints over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide operations for generating, distributing, maintaining, and/or updating guided web crawlers with corresponding software libraries and executable and pluggable application modules, including providing a community platform for generating and updating such modules. Various embodiments of the system(s) described herein may be provided by service provider server 130 and may be accessible by computing device 110 when accessing websites 140. Service provider server 130 includes one or more processing applications which may be configured to interact with computing device 110, websites 140, and/or other devices and servers for guided web crawlers and pluggable modules, as well as other computing services. In one example, service provider server 130 may be provided by PAYPAL®, Inc. of San Jose, CA, USA. However, in other embodiments, service provider server 130 may be maintained by or include another type of service provider.

Service provider server 130 of FIG. 1 includes service applications 132, a database 134, and a network interface component 138. Service applications 132 may correspond to executable processes, procedures, and/or applications with associated hardware. In other embodiments, service provider server 130 may include additional or different modules having specialized hardware and/or software as required.

Service applications 132 may correspond to one or more processes to execute modules and associated specialized hardware of service provider server 130 to process a transaction or provide other computing services to customers, merchants, and/or other end users and entities utilizing service provider server 130. In this regard, service applications 132 may correspond to specialized hardware and/or software used by service provider server 130 to provide computing services to users, devices, and applications, which may include electronic transaction processing and/or other computing services using accounts provided by service provider server 130. In some embodiments, service applications 132 may be used by users associated with computing device 110 to establish user and/or payment accounts, as well as digital wallets, which may be used to process transactions. The digital accounts may be accessed and/or used through one or more instances of a web browser application and/or dedicated software application executed by computing device 110 and/or other devices and servers to engage in computing services provided by service applications 132. Computing services of service applications 132 may also or instead correspond to messaging, social networking, media posting or sharing, microblogging, data browsing and searching, online shopping, and other services available through service provider server 130. Service applications 132 may therefore be used to request, view, process, and/or operate on data by computing device 110.

A user associated with computing device 110 may establish an account with service applications 132 and/or access another account with service provider server 130. For example, an account provided by HONEY® may be provided by checkout monitoring and/or coupon entry application. A more general account (e.g., a PAYPAL® account) may also provide the aforementioned account services and be utilized when performing web crawling during shopping and/or payment services. Service applications 132 may correspond to a product or service of service provider server 130 that may be utilized by end users to access, download/install, and/or utilize guided web crawler 120, as well as code, develop, and/or update pluggable module 124 and other pluggable modules for guided web crawler 120 and other applications, extensions, and/or computing operations. Service applications 132 may also include or utilize different processors, engines, or models as required for an authentication, account setup and maintenance, electronic transaction processing, deposit and/or withdrawal, and the like, for example, through one or more platforms that may be integrated through different API integrations to allow APIs of the platforms, services, and applications to exchange data. Service applications 132 may include one or more APIs that perform API calls and requests, and receive responses, in order to provided guided web crawlers and/or pluggable module downloading, installation, creation, updating, and/or other computing services.

In various embodiments, service applications 132 may be desired in particular embodiments to provide features to service provider server 130. For example, service applications 132 may include security applications for implementing server-side security features, programmatic client applications for interfacing with appropriate application programming interfaces (APIs) over network 150, or other types of applications. Service applications 132 may contain software programs, executable by a processor, including a graphical user interface (GUI), configured to provide an interface to the user when accessing service provider server 130 via one or more of computing device 110, where the user or other users may interact with the GUI to view and communicate information more easily. In various embodiments, service applications 132 may include additional connection and/or communication applications, which may be utilized to communicate information to over network 150.

Service applications 132 may include a transaction processing application configured to provide electronic transaction processing accounts, services, and operations to users via applications, websites, and the like, including authentication and checkout services on merchant or other websites that may be identified through crawling by computing device 110, as discussed herein. The transaction processing application may process a transaction or provide another payment service to merchants and customers of service provider server 130. In some embodiments, the transaction processing application may be used by a user associated with computing device 110 to establish a payment account and/or digital wallet, which may be used to process transactions. In various embodiments, financial information may be stored to the account, such as account/card numbers and information. A digital token for the account/wallet may be used to send and process payments, for example, through an interface provided by service provider server 130. The payment account may be accessed and/or used through a browser application/extension and/or dedicated payment application executed by computing device 110 and engage in transaction processing through the transaction processing application. In various embodiments, the transaction processing application may be used for authentication and/or checkout during web crawling activities using one or more guided crawlers. The transaction processing application may process the payment and may provide a transaction history for transaction authorization, approval, or denial.

Service applications 132 may also be used to generate, provide, distribute, update, and/or maintain a catalog or database of pluggable modules for use with different guided crawlers and/or configuration and coding by developers and users associated with those guided crawlers. For example, a community of users may individually or collectively generate, develop, update, and/or maintain different pluggable modules for different web crawling taskings, goals, and requested operations. Such modules may be specific to certain websites, webpages, browser applications or platforms, entities, or the like, or may be more general and webpage or browser agnostic. Service applications 132 may be used to provide a platform and/or host a system, forum, and/or community computing service for users to connect and collaborate on generating pluggable modules, as well as share generated or configured pluggable modules. In this regard, service applications 132 may further provide computing applications and services to code and/or develop pluggable modules, including designations of certain crawling actions or operations (e.g., those that may mimic or imitate user actions or inputs when browsing webpages), webpage resources of interest, and the like. Further, service applications 132 may provide recommendations, insights or advice/tips from other users and/or developers, and the like for generating pluggable modules. Service applications 132 may also provide intelligent systems to generate and/or update pluggable modules for specific goals or tasks (which may be selected or designated by a user) based on input data and/or features for one or more webpages of one or multiple websites. In this regard, ML and other AI models, engines, rules, and/or systems may also be trained for use with guided crawling states and/or to advance those states to a next state based on identifications, predictions, and/or classifications made for webpage data and/or browsing/crawling states.

For example, ML and other AI engines, models, rules, and the like may be used, in some embodiments, to train and determine, based on a dataset, crawling goals, resource identifications, crawling or webpage states, and the like. For example, ML engines may include AI models, such as ML or neural network (NN) models. AI models may generally correspond to any artificial intelligence that performs decision-making, such as rules-based engines and the like. However, AI models may also include subcategories, including ML models and NN models that instead provide intelligent decision-making using algorithmic relationships. Generally, NN may include deep learning models and the like, and may correspond to a subset of ML models that attempt to mimic human thinking by utilizing an assortment of different algorithms to model data through different graphs of neurons, where neurons include nodes of data representations based on the algorithms that may be interconnected with different nodes. ML models may similarly utilize one or more of these mathematical models, and similarly generate layers and connected nodes between layers in a similar manner to neurons of NN models.

When building ML models, training data may be used to generate one or more classifiers and provide recommendations, predictions, or other outputs based on those classifications and an ML model. The training data may be used to determine input features for training predictive scores or outputs, which may be used to generate a decision, classification, rule execution, or the like associated with coding, generating, and/or updating of a pluggable module. This may allow for training of ML model associations, clusters, and/or layers. For example, NN and/or other ML models may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models that attempt to classify or identify a webpage resource, next state for a crawling operation or webpage, and the like. By providing training data to train ML models, the nodes in the hidden layer may be trained (adjusted) such that an optimal output (e.g., a classification) is produced in the output layer based on the training data. By continuously providing different sets of training data and penalizing ML models when the output of ML models is incorrect, ML models (and specifically, the representations of the nodes in the hidden layer) may be trained (adjusted) to improve its performance in data classification. Adjusting ML models may include adjusting the weights associated with each node in the hidden layer. Thus, when ML models are used to perform a predictive analysis and output, the input may provide a corresponding output based on the classifications trained for ML models.

Additionally, service provider server 130 includes database 134. Database 134 may store various identifiers associated with computing device 110. Database 134 may also store account data for accounts 136, including payment instruments and authentication credentials, as well as transaction processing histories and data for processed transactions. Database 134 may store webpage data and/or resource data, including a repository associated with identified and/or verified webpage resources and/or sub-resources that may be used during guided web crawling sessions to identify and/or verify located or crawled resources for a webpage. Database 134 may include other data for accounts 136, which may include results from web crawling and/or pluggable modules used for web crawling. In this regard, where pluggable modules may be uploaded for distribution, collaborative development, and/or updating to service provider server 130, database 134 may further store such data for pluggable modules that may be utilized by a community of users.

In various embodiments, service provider server 130 includes at least one network interface component 138 adapted to communicate computing device 110, websites 140, and/or another device/server for a merchant over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Websites 140 may correspond to one or more online websites and associated resources to provide features, services, and other operations for a website host, which may provide information, computing services, products (e.g., items and/or services for sale), interactable features, and the like to users. In some embodiments, one or more of websites 140 may be hosted, provided by, and/or utilized by a merchant, seller, or the like to advertise, market, sell, and/or provide items or services for sale, as well as provide checkout and payment. In this regard, websites 140 may be utilized by one or more merchants to provide websites and/or online portals for transaction processing and sales. For example, websites 140 may be used to host a website having one or more webpages that may be used by customers to browse items for sale and generate a transaction for one or more items. Websites 140 may provide a checkout process, which may be utilized to pay for a transaction. In some embodiments, the checkout process may be provided by service provider server 130 based on one or more operations, software development kits (SDKs), application programming interface (API) standards or guidelines, and the like that may be implemented in the merchant website. The checkout process may be used to pay for a transaction using a payment instrument, including a credit/debit card, and account with service provider server 130, or the like. Websites 140 may be utilized by customers and other end users to view one or more user interfaces, for example, via graphical user interfaces (GUIs) presented using an output display device of computing device 110. These user interfaces may be used to navigate through items for sale on the merchant website, generate a transaction, and checkout for the transaction on the merchant website. Further, websites 140 may be processed and/or parsed to scrape and/or extract data (e.g., HTML/XML code and/or elements from HTML/XML/CSS documents for webpages) when viewing items, engaging in electronic transaction processing, or otherwise interacting with websites 140. Other embodiments of websites 140 may include those used for other online services, interactions, and/or information, including those used for messaging, social networking, media posting or sharing, microblogging, data browsing and searching, news, information streaming or uploading, and the like. Thus, computing device 110 may identify different features and resources of webpages for websites 140 when using guided web crawler 120 for a guided web crawling session.

Webpages 142 of websites 140 may provide features, services, and other operations for webpage data. In some embodiments, webpages 142 may be utilized to provide websites and/or online portals for transaction processing and sales and therefore host a website having one or more webpages that may be used to browse items for sale and generate a transaction for one or more items. Webpages 142 may then provide a checkout process, which may be utilized to pay for a transaction. The checkout process may be used to pay for a transaction using a payment instrument, including a credit/debit card, and account with service provider server 130, or the like. Webpages 142 may be utilized by a user and/or merchant to view one or more user interfaces (UIs), for example, via graphical UIs (GUIs) presented using an output display device of computing device 110. Thus, these UIs may be used to navigate through items for sale on the merchant website, generate a transaction, and checkout for the transaction on the merchant website.

In order to provide data and features for websites 140, webpages 142 may include webpage resources 144 corresponding to HTML or XML code, code snippets, identifiers, and/or tags for different ones of webpage resources 144, data, and/or features presented via webpages 142. These webpage resources 144 within one or more of webpages 142 provide the operations, input fields, menus, and the like to view and/or search, browse, navigate between websites 140 and/or webpages 142, enter user inputs, execute actions, present data, and/or process data. For example, with shopping and transaction processing, webpage resources 144 may include elements for authentication, login, items, coupons or savings entry, forms for shipping, billing, item, account identifier, fields identifying item total, sales tax, tip, shipping costs, etc., and the like. In other embodiments, webpage resources 144 may provide different webpage data and features. Computing device 110 may parse, browse, and/or crawl webpages 142 in an automated manner to identify and verify particular ones of webpage resources 144 using guided web crawler 120 with pluggable module 124, as discussed herein, and may determine whether any of the features, data, and/or resources occur on webpages of websites 140. If so, data may be extracted, which may allow for determination of data on the webpage and/or interaction with features and elements of the webpage.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
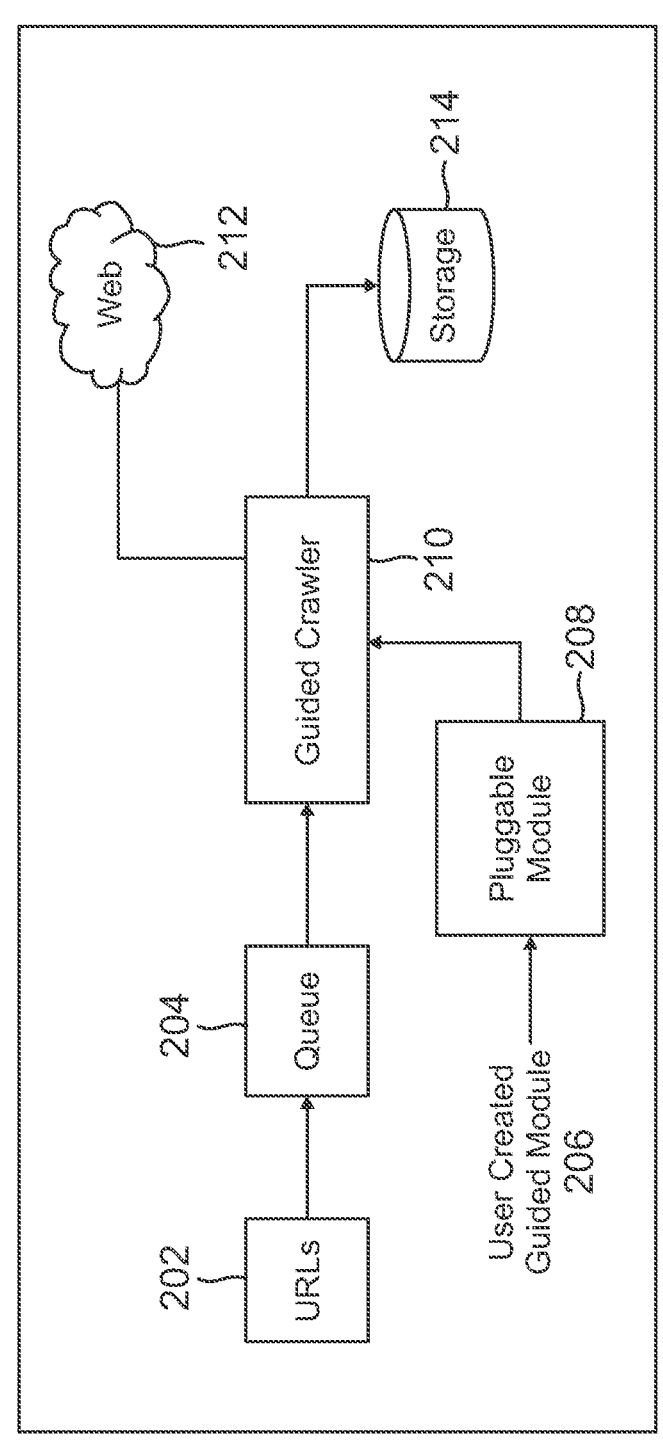
FIG. 2A-2C are diagrams of exemplary interactions with a guided web crawler for pluggable modules that automatically identify and verify webpage resources, according to embodiments.
Figure 2B:
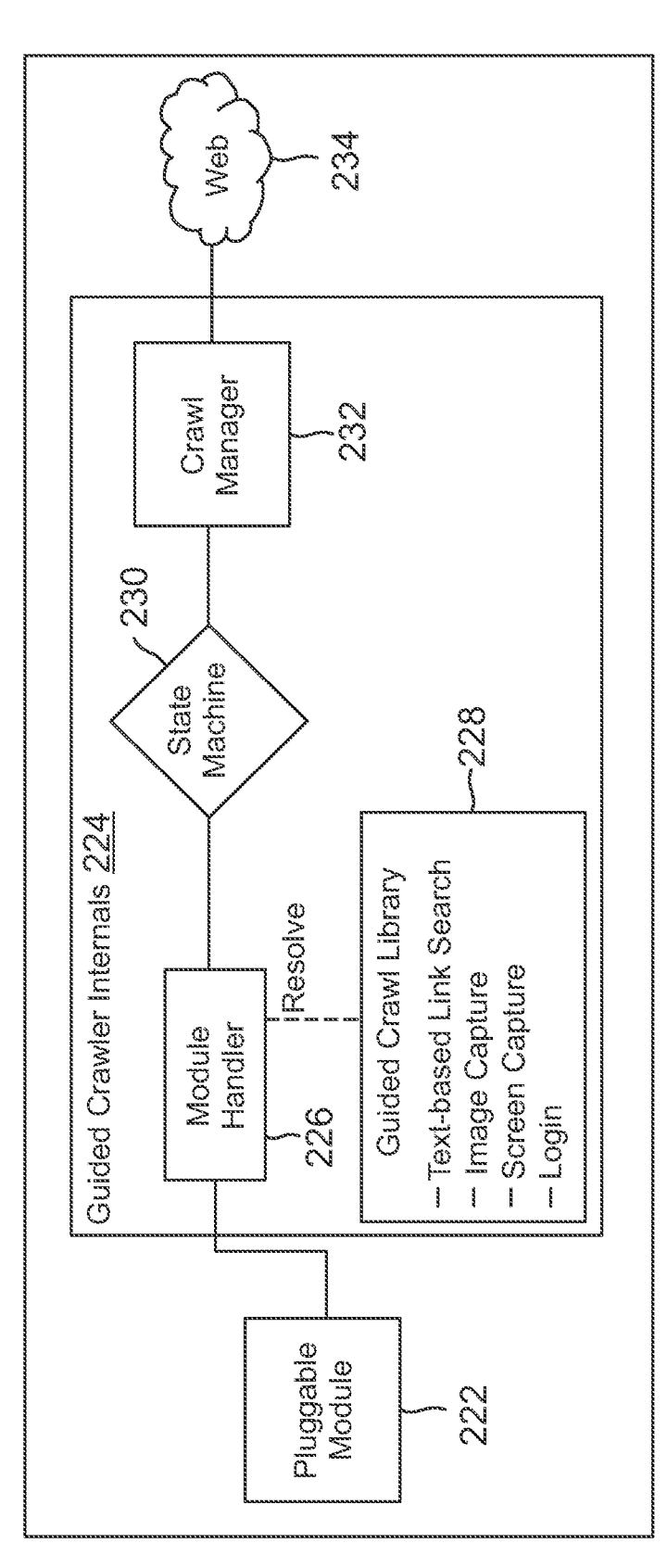
Figure 2C:
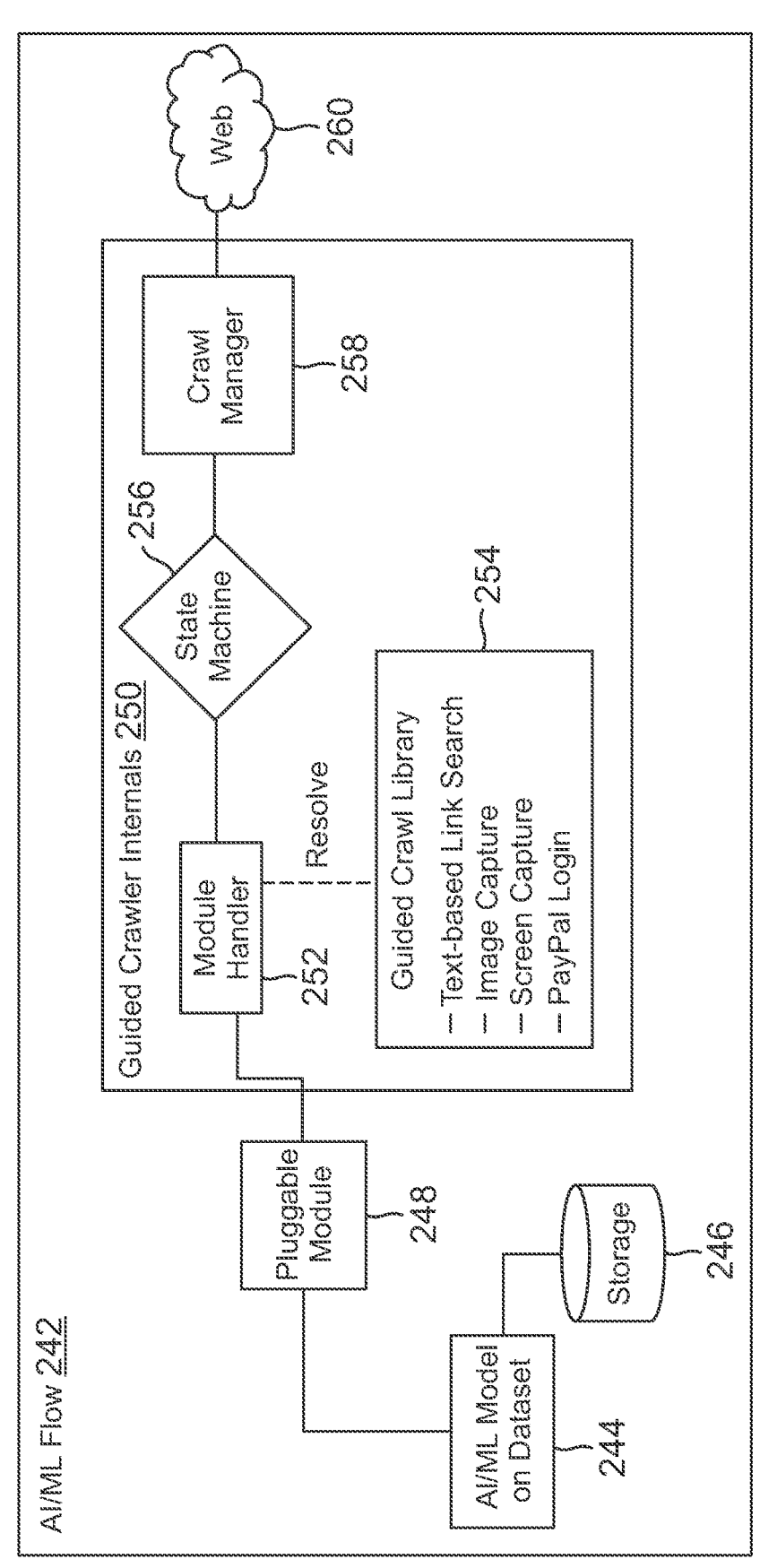

FIG. 2A-2C are diagrams 200a-200c of exemplary interactions with a guided web crawler for pluggable modules that automatically identify and verify webpage resources, according to embodiments. Note that one or more steps, processes, and methods described herein of the interactions in diagrams 200a-200c may be omitted, performed in a different sequence, or combined as desired or appropriate.

FIG. 2A includes diagram 200a that shows ingestion of webpage data from URLs 202 or other webpage addresses. In this regard, a device, such as computing device 110 in system 100 of FIG. 1, may execute a guided web crawler, such as guided web crawler 120 in system 100, in order to perform guided crawling tasks as shown in diagram 200a, as well as diagrams 200b and 200c. Diagram 200a includes an overview of components and interactions between such components for users for a guided web crawl of URLs 202 by the computing device. For example, the computing device may access URLs 202, which may be placed in a queue 204 for crawling and parsing in order to identify webpage resources that are of interest to a user based on a user created guided module 206, as well as verify such webpage resources.

For example, user created guided module 206 may correspond to a computing code, which may be provided in a pluggable format including a data package, file, or the like. User created guided module 206 may be coded, developed, and/or adjusted by one or more users and may be used to provide a pluggable module 208 that may be loaded and executed in a modular fashion (e.g., through exchange by loading and executing other pluggable modules on request or based on processing jobs) using a guided crawler 210. As shown in FIG. 2C, user created guided module 206 may also be created and/or maintained using ML models and/or other AI systems for identification of resources associated with a desired goal or outcome for a crawling task, as well as identification of steps or states of webpages and webpage data when crawling for specified resources.

Guided crawler 210 may correspond to an application, application plug-in or extension, and/or application routine or other executable operations to crawl webpages specifically to locate, identify, and verify webpage resources that are designated for discovery based on pluggable module 208 and/or other pluggable modules being executed in a modular manner. Thus, guided crawler may manage queue 204 based on interactions and/or instructions from pluggable module 208. Guided crawler 210 may parse, analyze, and/or crawl through webpage data from URLs 202 to identify webpage resources for webpages of URLs 202 that are available over a web 212, such as the Internet or other WAN, LAN, or the like. Guided crawler 210 may identify and/or verify the webpage resources on web 212, and may further store results of such processes from executing pluggable module 208 in a storage 214. Such results and stored data may include images, screenshots, HTML content and/or data, and other resources or sub-resources, where verification may be based on a repository of validated resources and/or sub-resources. In some embodiments, the results may also be displayed with and/or using web 212, such as by highlighting, navigating to, and/or otherwise displaying or rendering identified webpage resources and/or webpages/sections of webpages associated with identified and/or verified webpage resources.

Diagram 200b of FIG. 2B includes a display of execution of a pluggable module 222 using guided crawler internals 224 for a guided crawler, such as guided web crawler 120 and/or guided crawler 210 previously discussed. In this regard, diagram 200b shows that pluggable module 222 may be loaded and/or executed by the guided crawler during an interaction and/or operation of the guided crawler with pluggable module 222. Guided crawler internals 224 include a module handler 226 that may process and execute the code and instructions of pluggable module 222 for webpage resource identification and verification. Module handler 226 may dynamically resolve and handle webpage data, such as links and other webpage features, elements, resources, and data using a guided crawl library 228. This may correspond to a preconfigured library for use by the guided crawler with different pluggable modules and may form a basis for guided crawling operations to identify and verify webpage resources.

Guided crawl library 228 may correspond to a software library having operations and executables associated with different webpage resources for identification and verification. For example, guided crawl library 228 may include operations for a text-based link search, an image capture, a screen capture, a login, and the like, and may be used to mimic or imitate user actions and inputs when browsing a webpage. Such inputs may include authentications, field or menu selections and/or form filling, navigations, link or data selection and/or interaction, and the like. A state machine 230 may be used when crawling webpage data to determine a next state or action to execute during web crawling using pluggable module 222, where a crawl manager 232 determines, locates, identifies, and/or verifies webpage resources, as well as advancement through and/or transitions between states of state machine 230 based on state transitions and parsed webpage data. Thereafter, web 234 may be interacted with and/or utilized to provide outputs of the crawling session.

Diagram 200c of FIG. 2C includes an AI/ML flow for use of ML models and/or other AI systems and operations during web crawling using a guided web crawler. The AI/ML flow may correspond to executable steps or operations for a guided web crawler to utilize an AI or ML model, ruleset, engine, or the like for advancement between states during web crawling, which allows for the web crawler to intelligently predict or classify webpage data, resources, features, and the like during crawling. This allows for the web crawler to take actions and advance through a crawling session intelligently based on those predictions. For example, an AI/ML model 242 may be trained on a dataset associated with webpage data and webpage resources for identification and verification, and may therefore be trained for parsing or crawling webpage data for webpages to locate webpage resources. In this regard, the ML model and/or other AI system may be used to advance between states in a state machine by making intelligent predictions or classifications of states and state transitions of the state machine based on webpage data being parsed, analyzed, and/or crawled. Advance between states allows for crawling through webpage data for webpage resource identification, for example, by determining a next state to advance to, a state to return to, or otherwise a next action or state to execute during crawling operations. ML models may also be used to generate and/or determine these states and state transitions for advancement during generation of pluggable modules, such as based on webpage data for webpages and a requests web crawling task.

AI/ML model 242 may be accessed from a storage 246 and used to generate and/or execute a pluggable module 248 through identifying next states of a state machine that advances through webpage features, resources, and other data during web crawling in a guided manner. Pluggable module 248 may then be provided to the guided web crawler in diagram 200c, which may process pluggable module 248 in a similar manner to the guided web crawler(s) discussed in reference to diagrams 200a and 200b. For example, a module handler 252 may handle pluggable module 248 with a guided crawl library 254. AI/ML model 244 may be utilized with and/or to proceed through states of state machine 256, which may crawl or parse through webpage data. Based on identified resources, crawl manager 258 may provide an output or interaction with a webpage on web 260, which may be provided through the client device executing the corresponding guided web crawl session.

Figure 3:
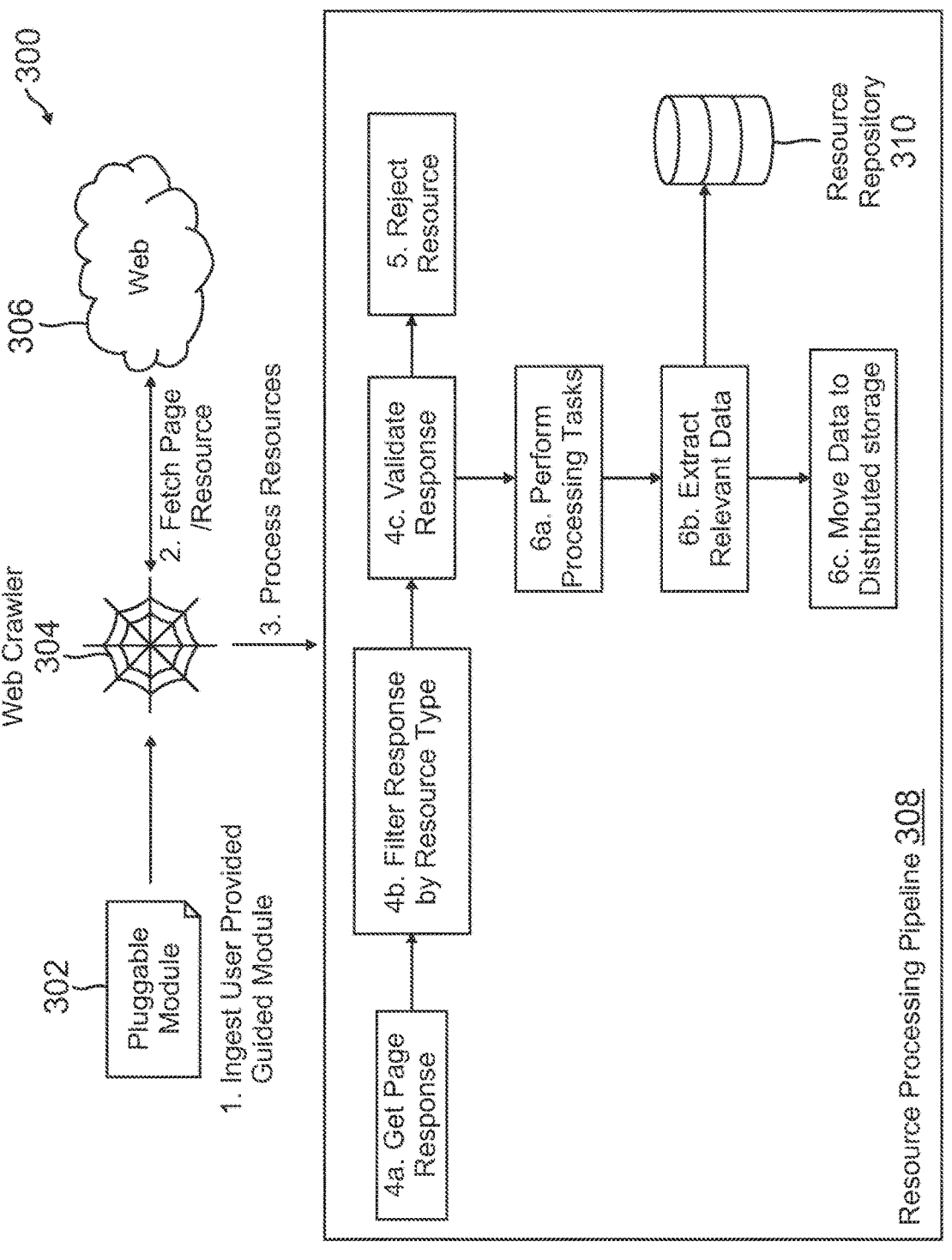
FIG. 3 is exemplary system environment used to provide a guided web crawler using pluggable modules for automated identification and verification of webpage resources, according to an embodiment.

FIG. 3 is exemplary system environment 300 used to provide a guided web crawler using pluggable modules for automated identification and verification of webpage resources, according to an embodiment. System environment 300 includes a pluggable module 302, which may correspond generally to pluggable module 124 for guided web crawler 120 discussed in reference to system 100 of FIG. 1, which may be executed for web crawling through webpages accessed by the computing device. In this regard, the computing device may use a web crawler 304 to crawl webpages of websites on a web 306, which may correspond generally to guided web crawler 120 during interactions with browser application 112 and websites 140 discussed in reference to system 100. System environment 300 may correspond to a system for crawling webpages on web 306 via web crawler 304 in a guided manner for identification and verification of webpage resources of interest and/or designated by a user through pluggable module 302.

In system environment 300, the guided crawler executing pluggable module 302 may enable users to simulate a browsing session and selectively crawl parts of the webpages of a website. Pluggable module 302 being executed by the guided crawler with a software library of webpage resource identification and verification operations, routines, and identifiers may operate by performing actions based on certain user inputs including clicking a link, scrolling a page, searching for keywords/terms in a page, filling a form, and the like. Such automated user inputs that are imitated or mimicked may be performed to carry out the browsing flow conventionally conducted by a user when the user obtains the information, website data or features, and the like that the user is looking for during a browser session. However, automating the processes using pluggable module 302 with the guided crawler may provide a more efficient, faster, and automated manner (e.g., without requiring user inputs and navigations, which requires data loading and processing including downloading of unnecessary webpage data). Thus, at an interaction 1, a user provides pluggable module 302, and ingestion of pluggable module 302 may be performed by a guided crawler using a software library for webpage resource tools and executable operations. Users may provide their crawl logic in the form of a script or modules that will guide the crawling session in a manner conducive to the user's use case, crawling goal, and/or requested webpage resource identifications and/or verifications, which enables users to eliminate unnecessary nuances, navigations, browsing, data loading and/or downloading, scrolling, and the like of a website, thereby reducing the volume of unrequired data processing and loading to a large extent. At an interaction 2, web crawler 304 fetches webpages, data and documents, and resource/sub-resources from web 306 for the identified webpages and/or websites. This allows web crawler 304 to process the resources at an interaction 3 with a resource processing pipeline of the guided web crawler executing pluggable module 302.

In this regard, web crawler 304 may provide operations for identifying and verifying resources/sub-resources of a web page during the guided crawl, thereby providing an advancement over existing and conventional procedures that mandates manual navigation and relies on capabilities of developer tools of browsers to verify the resources of a web page when performing web crawls and other browsing sessions. The guided crawler is further associated with and enables a platform for users to supply their modules, which may be used with an updateable and enriched library that users can use to invoke specific webpage resource identification and verification operations during web browsing from their generated and/or configured module. The library may include helper functions such as finding text in a page, performing a login, scrolling, navigation or parsing through forms and menus for form/menu filling, navigating, highlighting, data extracting for webpage resources, and the like. In this regard, the components and interactions in system environment 300 may be use to inspect websites for specific behaviors of fraud and risk by performing user-flow based navigation, scrutinizing resources on webpages, and analyzing contents at scale, which may be used for fraud detection, determination of webpage resource integration and/or integrations with external service providers and platforms, resource verification for trusted integrations and provided webpage features, identifying savings and coupons, and/or identifying webpage policies and resources via links and other webpage data.

At an interaction 4a, resource processing pipeline 308 gets a webpage response from fetching and processing webpage resources based on webpage data and pluggable module 302. The response is filtered by sub-resource type and/or identifications at an interaction 4b, which allows for validating the response at an interaction 4c. Interaction 4c may determine if a valid page response is returned for a resource or sub-resource and that the resource or sub-resource is accessible via the webpage. Further, the page response may be used to determine if the resource or sub-resource is one for identification and/or verification (e.g., set in pluggable module 302 for crawling and identifying, as well as other automated interaction). If not a valid response, unavailable, and/or not of interest from pluggable module 302, at an interaction 5, the resource or sub-resource is rejected and the state machine for pluggable module 302 may advance to further resource analysis.

However, if a valid resource or sub-resource response, at an interaction 6a, processing tasks are performed with the resource or sub-resource. Pluggable module 302 may provide the capabilities (e.g., to web crawler 304) to identify resources through their text or position in the webpage, as well as webpage code, resource identifiers, and the like. Pluggable module 302 may provide capabilities to perform actions like filling out a form, clicking on an element, hovering over an element, scrolling up/down, etc., which may mimic a user's interactions and/or inputs with respect to the valid resource or sub-resource identified. Thus, during interaction 6a, pluggable module 302 may enable web crawler 304 to identify the resource and take appropriate actions to proceed with the crawl in an intentional and designated manner.

Pluggable module 302 with web crawler 304 on a webpage may request the platform to extract and/or save the complete HTML page or specific resources and/or sub-resources of the webpage during interactions 6b and 6c of web crawler 304. For example, the resources or sub-resources of the webpage may be images, scripts, stylesheets, videos, etc. When a webpage's content is pulled by web crawler 304 from web 306, the returned response may contain assets required for the browser to assemble the webpage for display and output. These assets may be sent as HTTP responses, where each response may be intercepted by web crawler 304 using an event listener. Responses of interesting resources and sub-resources are intercepted and filtered out during interactions 4a-5, and those of interest are processed during interactions 6a-6c with a resource repository of valid and/or verified resources and/or sub-resources. Thus, the response may be validated with various checks to ensure a resource or sub-resource is valid, which may include data extraction at interaction b and comparison to valid resources and/or sub-resources in resource repository 310. Thereafter the processed data for the webpage and/or results of web crawling in the guided manner may be stored in a distributed data storage, such as after the resource or sub-resource is matched against resource repository 310 for verification.

FIG. 4 is a flowchart 400 for automated identification and verification of webpage resources through a guided web crawler, according to an embodiment. Note that one or more steps, processes, and methods described herein of flowchart 400 may be omitted, performed in a different sequence, or combined as desired or appropriate.

At step 402 of flowchart 400, computing code for a pluggable module of a guided web crawler is received. A user, such as a developer, end user, employee or administrator at a company or other entity, and the like may code, generate, develop, and/or update pluggable modules, such as data files and/or containers that are executable by guided web crawler application and/or operations. The pluggable module may correspond to computing code in a package or file that may be loaded, executed, and/or exchanged with other pluggable modules to perform specified web crawling tasks in a guided manner. At step 404, the pluggable module is loaded with the guided web crawler for use with a software library of the guided web crawler. The guided web crawler may correspond to a standalone application that interfaces with the Internet or other web and/or a web browser application, or may correspond to an application extension or operations for guided crawling. Thus, the guided web crawler may include a software library that designates specific actions and/or inputs that may be executed and/or provided during guided crawling for webpage resource identification and verification based on the loaded pluggable module.

At step 406, webpage data for a webpage accessed by a browser application on a computing device executing the guided web crawler is detected. The webpage data may correspond to one or more files or documents for webpage code, which may include identifiers and/or other data for identification of webpage resources. The webpage data may be accessed from one or more webpages of a website accessed by the browser application and/or guided web crawler, which may be open in such application(s) and/or designated by the pluggable module. At step 408, the webpage data is parsed and/or crawled for webpage resources on the webpage using the guided web crawler executing the pluggable module. For example, the pluggable module may correspond to executable code and/or scripts generated for webpages to crawl, scan, and/or parse such webpages for webpage resources. The modules may parse webpage code and/or DOM trees to identify webpage elements, identifiers, and code snippets associated with webpage resources. The modules may correspond to a JavaScript set or the like that can be passed to cause the extension or application to parse webpage data, which may be webpage specific and/or agnostic and used with multiple webpages. This may be detected from a URI or URL entered to a web browser and/or accessed through a different device application (e.g., a resident local application for the device) for the webpage(s) for crawling. The address for the webpage(s) may be processed by the extension and/or application when executing, requesting, and/or fetching the pluggable module. This allows for using a state machine to proceed through states and state transitions of webpage elements, features, data, and/or resources for webpage resource identification and verification.

At step 410, a webpage resource requested for the crawl is identified when the guided web crawler parses and/or crawls the webpage data. When proceeding through the states, the guided web crawler may identify, using the pluggable resource and selection of requested webpage resources, webpage resources of interest and/or designated by the pluggable module, such as based on identifiers, resource effects and/or outputs, resource data, and the like. The identification(s) may be based on page responses and provided webpage data, and may be filtered by resource and/or sub-resource type prior to processing for resource identification. At step 412, the webpage resource is verified to be valid. The verification of a resource or sub-resource may be based on a repository of valid resources and/or sub-resources, such as those with the webpage or other webpages that are previously validated and/or otherwise trusted and/or verified. Further, additional processing tasks, navigations, or inputs may be provided with the verification, such as interacting with and/or utilizing the webpage resource or otherwise highlighting navigating to, and using the resource. During use, data relevant to the webpage resource may be extracted and may be output and/or moved to a distributed storage with crawling results.

Figure 5:
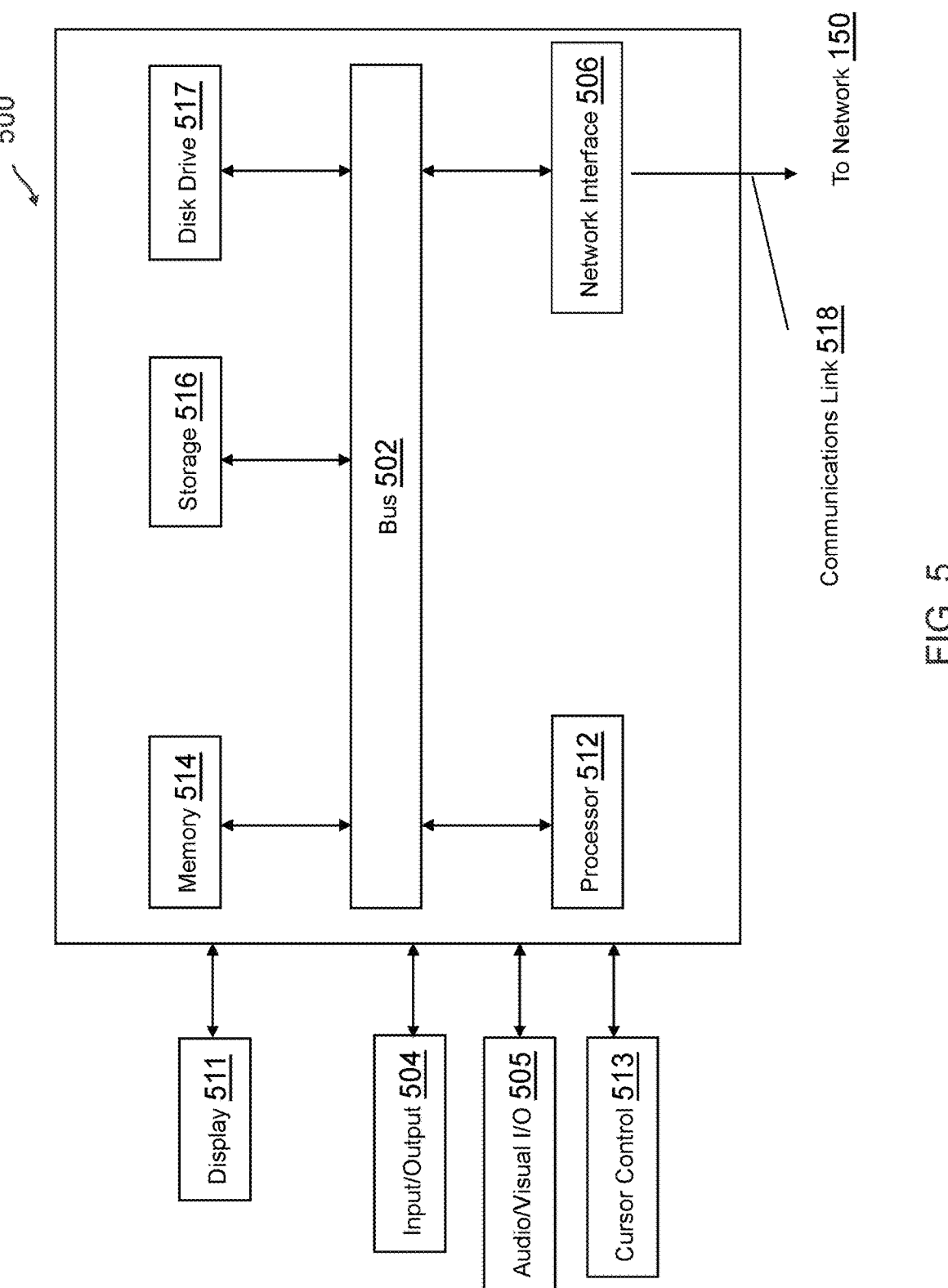
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on gift cards, other types of funding sources that can be used to fund a transaction and provide additional value for their purchase are also within the scope of various embodiments of the invention. Thus, the present disclosure is limited only by the claims.

What is claimed is:

1. A system comprising:

a non-transitory memory; and one or more hardware processors coupled to the non-transitory memory and configured to read instructions from the non-transitory memory to cause the system to perform operations comprising:

determining, based on a webpage and a function to execute on the webpage, a module of a plurality of modules utilizable with a browser application to automate one or more user inputs associated with browsing the webpage for the function, wherein the module includes computer code executable by the system with the browser application;

detecting a navigation to the webpage accessed via the browser application, wherein the webpage comprises a plurality of webpage resources utilizable via the webpage;

executing the computer code to cause the browser application to automate the one or more user inputs that perform the function on the webpage;

parsing webpage data for the webpage based on the executing the computer code, wherein the plurality of webpage resources are identifiable from the webpage data;

identifying, based on executing the computer code and parsing the webpage data, a webpage resource on the webpage from of the plurality of webpage resources; and directing the browser application to the webpage resource.

2. The system of claim 1, wherein each module of the plurality of modules is interchangeable with a guided web crawler of the browser application that automates the one or more user inputs that execute the function, and wherein the function comprises a helper function of the guided web crawler that performs application operations corresponding to the one or more user inputs.

3. The system of claim 2, wherein, prior to the executing, the operations further comprise:

loading the module from the plurality of modules to the guided web crawler from an application library.

4. The system of claim 3, wherein the application library enables a user utilizing the browser application to select the module from the plurality of modules, and wherein, prior to the determining the module, the operations further comprise:

receiving a selection of the module from the plurality of modules for the guided web crawler.

5. The system of claim 1, wherein the plurality of modules are utilizable by one of an extension, an add-on, or a tool utilizable with the browser application to cause the browser application to perform the function.

6. The system of claim 1, wherein the one or more user inputs enable a navigation through the webpage or an inspection of the webpage, and wherein the module causes the browser application to automate an entry of one or more user inputs by imitating the entry of the one or more user inputs to reduce loading, downloading, or rendering of the webpage data for the webpage in the browser application.

7. The system of claim 1, wherein the directing the browser application to the webpage resource includes at least one of navigating to the webpage resource on the webpage, navigating to another webpage through a navigation link on the webpage, or automatically selecting the navigation link on the webpage without a further user input.

8. The system of claim 1, wherein the webpage data comprises webpage computer code associated with at least one of Hypertext Markup Language (HTML), Extensible Markup Language (XML), JavaScript, or domain object model (DOM) trees, and wherein the function is associated with identifying resource computer code for the webpage resource in the webpage computer code.

9. A method comprising:

receiving a selection of a module from a plurality of modules of a browser application, wherein each of the plurality of modules enables a guided web crawler to automatically perform operations corresponding to browsing inputs to the browser application, and wherein one or more of the browsing inputs for the module selected are usable for an identification of a webpage resource on a webpage;

detecting a navigation to the webpage in the browser application, wherein the webpage is identified by the module for the guided web crawler;

operating the guided web crawler with the webpage using the module being executed by the browser application, wherein operating the guided web crawler comprises imitating the browsing inputs to the browser application based on the navigation to the webpage;

performing a web crawl of the webpage based on operating the guided web crawler, wherein performing the web crawl parses the webpage for a plurality of webpage resources including the webpage resource for the identification;

identifying the webpage resource based on the performing the web crawl; and outputting the identification of the webpage resource in the browser application responsive to the navigation.

10. The method of claim 9, wherein each of the plurality of modules is a pluggable software module configures to be added to or removed from an execution by the guided web crawler using a software library.

11. The method of claim 10, further comprising:

loading the module to the guided web crawler based on the selection from the software library.

12. The method of claim 9, wherein the software library enables selections of the plurality of modules to be configured prior to or during browsing sessions using the browser application.

13. The method of claim 9, wherein the guided web crawler comprises a component of an extension, an add-on, or a tool of the browser application.

14. The method of claim 9, wherein the browsing inputs comprise navigation inputs associated with browsing the webpage, and wherein the guided web crawler imitates the navigation inputs during the web crawl to navigate to the webpage resource.

15. The method of claim 9, wherein the outputting the identification comprises directing a user interface of the browser application to the webpage resource.

16. The method of claim 9, wherein the parsing the webpage comprises analyzing webpage code associated with at least one of Hypertext Markup Language (HTML), Extensible Markup Language (XML), JavaScript, or domain object model (DOM) trees, and wherein the webpage code is analyzed for the identification the webpage resource based on imitating the browsing inputs by the guided web crawler.

17. A non-transitory machine-readable medium having stored thereon machine-readable instructions executable to cause a machine to perform operations comprising:

detecting a navigation to a webpage in a browser on a computing device, wherein the webpage comprises a plurality of webpage resources utilizable via the webpage;

determining a module selected for an execution of a function that crawls the webpage for one or more of the plurality of webpage resources, wherein the module comprises one of a plurality of modules that automate user inputs associated with browsing the webpage, and wherein the plurality of modules each correspond to computer code that automates the user inputs;

executing the computer code to automate the user inputs for the function based on the module;

determining, based on the executing, the one or more of the plurality of webpage resources associated with the execution of the function independent of the user inputs to the browser for the function; and directing the browser to the one or more of the plurality of webpage resources on the webpage, wherein the directing causes the one or more of the plurality of webpage resources to be visible to a user of the computing device when viewing the browser.

18. The non-transitory machine-readable medium of claim 17, wherein, prior to the detecting the navigation, the operations further comprise:

receiving a selection of the module from the plurality of modules via a software library associated with the browser.

19. The non-transitory machine-readable medium of claim 17, wherein the plurality of modules corresponds to pluggable modules configured to be added or removed from being executed by the browser based on the navigation or other navigations in the browser.

20. Of claim 19, wherein the pluggable modules are configured to be added to or removed from an extension of the browser that corresponds to a guided web crawler.

* * * * *